United States Patent [19]

Odagiri

[11] Patent Number: 4,752,842
[45] Date of Patent: * Jun. 21, 1988

[54] TAPE DRIVING SYSTEM FOR A MAGNETIC TRANSFER APPARATUS

[75] Inventor: Yoichi Odagiri, Yokohama, Japan

[73] Assignee: Sony Corporation, Tokyo, Japan

[*] Notice: The portion of the term of this patent subsequent to Dec. 2, 2003 has been disclaimed.

[21] Appl. No.: 924,176

[22] Filed: Oct. 28, 1986

Related U.S. Application Data

[63] Continuation of Ser. No. 573,634, Jan. 25, 1984, abandoned.

[51] Int. Cl.$^4$ .......................... G11B 5/86; G11B 15/48; G11B 15/43
[52] U.S. Cl. ...................................... 360/74.1; 360/17; 360/71; 360/91
[58] Field of Search .................... 242/75.1, 186, 189, 242/190, 192, 201–204, 182, 183; 360/16, 17, 71, 74.1, 74.3, 90, 91, 102, 128–129, 130.3–130.32; 318/7

[56] References Cited

U.S. PATENT DOCUMENTS

| | | | |
|---|---|---|---|
| 3,037,090 | 5/1962 | Bouzemburg | 360/17 |
| 3,151,796 | 10/1964 | Lipschutz | 360/90 X |
| 3,297,268 | 1/1964 | Sawazaki | 360/90 X |
| 3,544,732 | 12/1970 | Bauer | 360/17 |
| 3,713,606 | 1/1973 | Van Pelt et al. | 242/184 |
| 3,829,038 | 8/1974 | Studer | 242/190 |
| 3,873,896 | 3/1975 | Jennings | 318/7 |
| 3,893,167 | 7/1975 | Stahler | 360/17 |
| 3,910,527 | 10/1975 | Buhler et al. | 242/186 |
| 3,921,208 | 11/1975 | Chapman | 360/17 |
| 4,278,213 | 7/1981 | Rubruck | 242/75.1 |
| 4,626,931 | 12/1986 | Hori et al. | 360/16 |

FOREIGN PATENT DOCUMENTS

| | | | |
|---|---|---|---|
| 50-154598 | 6/1977 | Japan | 242/186 |
| 57-64355 | 4/1982 | Japan | 360/74.1 |
| 58-100233 | 6/1983 | Japan | 360/16 |
| 58-137137 | 8/1983 | Japan | 360/71 |

*Primary Examiner*—S. J. Heinz
*Assistant Examiner*—Benjamin E. Urcia
*Attorney, Agent, or Firm*—Lewis H. Eslinger; Cooper & Dunham

[57] ABSTRACT

The tape drive device for a magnetic transfer apparatus comprises a master tape and a slave tape wound about a rotary drum and kept in intimate pressure contact with one another by air jetted from a rectangular nozzle formed in an air guide member enclosing and secured to a magnetic head. During tape running, tension on each tape is controlled to a constant value by tension sensors associated with respective tape reels. When it is desired upon termination of transfer operation to stop the tape travel, the tape reels for a slave tape presenting a higher inertia are braked first. The remaining reels presenting a lower inertia are then acted upon and the tape tension sensing means associated therewith are operated to control the tension to a constant value in the course of simultaneous cessation of the tape travel.

2 Claims, 4 Drawing Sheets

TAPE DRIVING SYSTEM FOR A MAGNETIC TRANSFER APPARATUS

This is a continuation of application Ser. No. 06/573,634, filed Jan. 25, 1984, and now abandoned.

BACKGROUND OF THE INVENTION

1. Field of the Invention

This invention relates to a tape driving system for a magnetic transfer apparatus in which at least two magnetic tapes are pressed against the outer periphery of a rotary drum and driven thereon in close pressure contact with one another. More particularly, it relates to a tape drive device useful in a magnetic transfer apparatus in which magnetic recording on a master tape is transferred to a slave tape in intimate contact with said master tape while said master and slave tapes are driven in this state on the periphery of the rotary drum.

2. Description of the Prior Art

In recent years, magnetic recording and reproducing apparatus such as video tape recorder or audio tape recorder have become very popular. In keeping pace therewith, there is an increasing demand for various prerecorded tapes. Thus it has become necessary to duplicate a large number of copy tapes from a prerecorded master tape (also called mother tape).

As means for preparing these copy tapes, it is known to reproduce magnetic recording on the master tape and to rerecord the output signal on an unrecorded tape or slave tape (so-called dubbing method) or to magnetically transfer the residual magnetic pattern on the master tape to the unrecorded or slave tape (magnetic transfer method). In the conventional practice, the first method (dubbing method) is predominant and the signals from a master reproducing device or tape deck are sent to plural copy tape recorders or tape decks for rerecording.

However, when resorting to dubbing, at least two tape decks, that is, a master tape reproducing device and a copy tape recording device are required, resulting in elevated equipment costs. In addition, signal deterioration may be caused through the signal reproducing and recording process. Above all, since the recording tracks are formed diagonally across the tape width in video tape recorders, the recording track pattern obtained with the copying tape decks may vary on account of manufacturing tolerances of the rotary heads of the copying tape decks. The result is poor interchangeability, that is, variable image quality obtained with different reproducing tape decks.

Although not so popular in the past as the first method because of, for instance, lowered transfer signal intensity, the second method, that is, the magnetic transfer method, has come to the stage of commercial application with development of the master tape with high residual magnetism and progress in magnetic transfer technology. With the magnetic transfer method, copy tapes can be prepared by a unitary device and the playback and recording process can be eliminated. In this manner, the playback or recording heads such as rotary magnetic heads, playback circuits or recording circuits can be dispensed with, thus resulting in a simplified structure and elimination of signal deterioration caused by signal playback and recording. In addition, even when the recording tracks are formed diagonally across the tape width, as in the case of the video tape recorder, since the master and copy tapes are intimately contacted with each other, and the magnetic pattern is directly transferred from the master tape to the copy tape, the recording track pattern on the copy tape may be substantially identical in signal quality or accuracy with that on the master tape. In this manner, the copy tapes obtained with the second method may be completely free from fluctuations and superior in interchangeability.

The magnetic transfer apparatus for producing copy tapes through magnetic transfer is provided with a tape driving system adapted for simultaneously driving at least two magnetic tapes, that is, a master or mother tape and a slave or copy tape, that are wound on the outer periphery of a rotary or transfer drum in intimate contact with one another. When it is desired to suddenly stop the travel of these two or more tapes while being driven simultaneously, since the tape supply and take-up reels have different rotational inertia, it is not possible to stop the rotation of the reels simultaneously, thus resulting in unusual tension applied to the respective tapes. Such unusual tension may be prevented in some measure by applying a brake slowly to the respective tape reels. However, this is not desirable because effective magnetic transfer is inhibited during the braking period thus lowering the operating efficiency of the magnetic transfer apparatus. For instance, even when a single prerecorded program can be transferred in several tens of seconds on account of high speed transfer technology, the overall transfer efficiency would be lowered if nearly several tens of seconds are required in stopping the tape travel.

SUMMARY OF THE INVENTION

It is therefore a principal object of the present invention to obviate the abovementioned deficiency of the prior art device and to provide a tape drive system for a magnetic transfer apparatus in which plural tapes driven simultaneously on the peripheral surface of the rotary drum in intimate contact with one another can be stopped promptly and thus with a fast response time without causing unusual tension in the respective tapes.

In view of the abovementioned object, the present invention is directed to a tape drive device for a magnetic transfer apparatus comprising a master tape on which original signals are prerecorded and a slave tape on which said original signals are to be transferred magnetically, said master and slave tapes being wound on the periphery of a rotary drum in intimate contact therewith and with each other and driven simultaneously thereon for performing a magnetic transfer of said original signals from said master tape to said slave tape. According to the invention, tape tensioning means are separately provided in the vicinity of a supply reel for said master tape, a take-up reel for said master tape, a supply reel for said slave tape and a take-up reel for said slave tape, for maintaining a constant tension in the vicinity of said reels during tape running through associated servo control. When stopping the master and slave tapes, reel motors associated with said supply and take-up reels are acted upon for stopping said master and slave tapes simultaneously in such a condition that a brake is applied to at least one of said supply and take-up reels of said master tape or said slave having a larger inertia. The tape tension sensing means associated with the remaining reels are operable in this case for maintaining a constant tension in the associated tapes in the course of simultaneous cessation of travel of the respective tapes.

DESCRIPTION OF A PREFERRED EMBODIMENT

Reference is now made to the accompanying drawings showing a preferred embodiment of the present invention.

Figure 1:
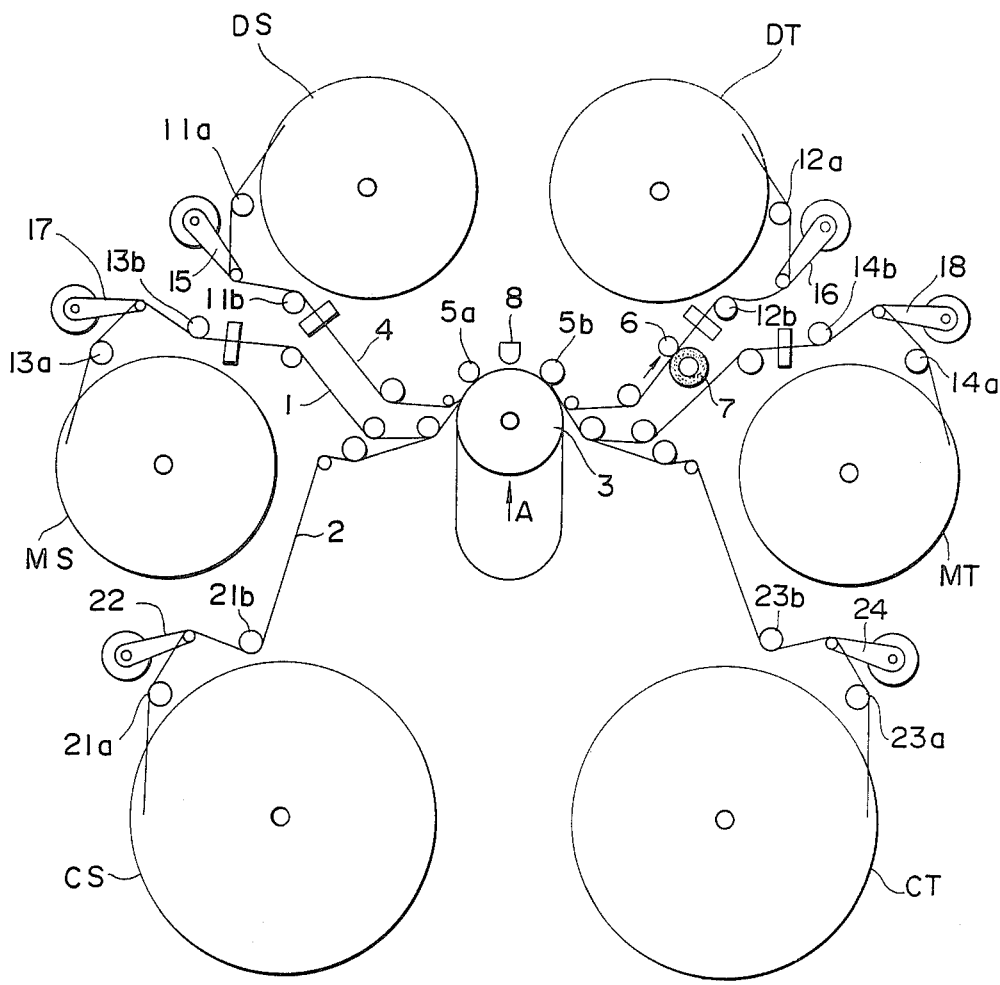
FIG. 1 is a schematic front view showing the tape drive device for the magnetic transfer apparatus embodying the present invention.

FIG. 1 shows in a schematic front view a preferred embodiment of a tape driving device for a magnetic transfer apparatus according to the present invention. In this figure, the numeral 1 denotes a master or mother tape carrying thereon a magnetic recording of an original program to be duplicated, and the numeral 2 a slave or copy tape on which the original program is to be transferred from master tape 1. The master tape 1 and the copy tape 2 are wound partially about a rotary transfer drum 3 through an angular extent of, for instance, 120 degrees and guided to travel thereon in an overlapping and closely contacting relation to each other. This rotary drum 3 is designed easily rotatable by reducing its rotational inertia to as small a value as possible. The tapes 1, 2 are driven by a driving tape 4 adapted for contacting with tapes 1, 2 wound about rotary drum 3 from outside. The tapes 1, 2 and the driving tape 4 are pressed against the outer periphery of rotary drum 3 by pressure rolls 5a, 5b in such a manner that their relative position in the tape proceeding direction is fixed positively during travel. The driving tape 4 itself is driven in the direction of the arrow mark in FIG. 1, as it is clamped between a capstan 6 and a pinch roll 7. A magnetic transfer head unit 8 is provided above the outer surface of the rotary transfer drum 3 between pressure rolls 5a and 5b.

Figure 4:
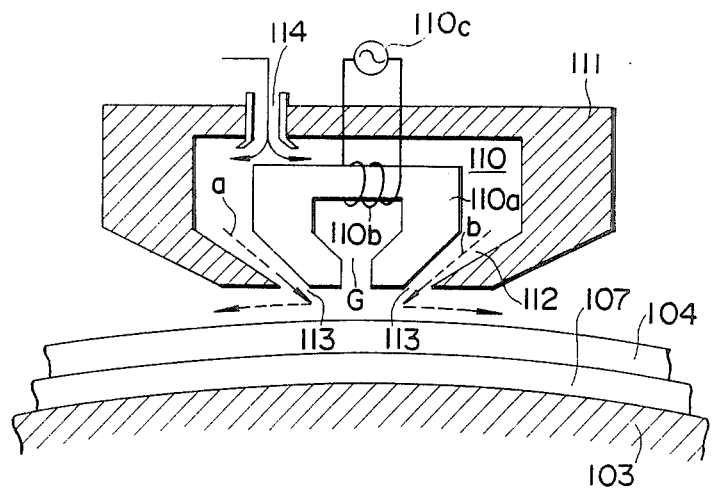
FIG. 4 is a sectional view showing a transfer head unit.

The magnetic transfer head unit 8 is shown in FIG. 4 and has an air guide member 111 in which is enclosed a magnetic transfer head 110 consisting of a magnetic core 110a, a coil 110b and an electrical source 110c. An air guide cap 112 for guiding air under elevated pressure is defined between the inner wall of air guide member 111 and the outer peripheral surface of the magnetic core 110a of the transfer head 110, in such a manner that a substantially rectangular nozzle 113 (see FIG. 6) is defined in an air jetting zone of the air guide gap 112. On the reverse side of the air guide member 111 is an inlet opening 114 for introducing a high pressure air into the air guide member. In the abovementioned construction, the high pressure air introduced through inlet opening 114 is jetted through air guide gap 112 and nozzle 113 onto those portions of the master tape 104 and slave tape 107 on the rotary drum 103 that are then disposed ahead of a magnetic gap G of the transfer head 110 in such a manner that high pressure air currents shown by arrow marks a, b in FIG. 4 intersect each other at approximately the center of the magnetic gap G.

Figure 5:
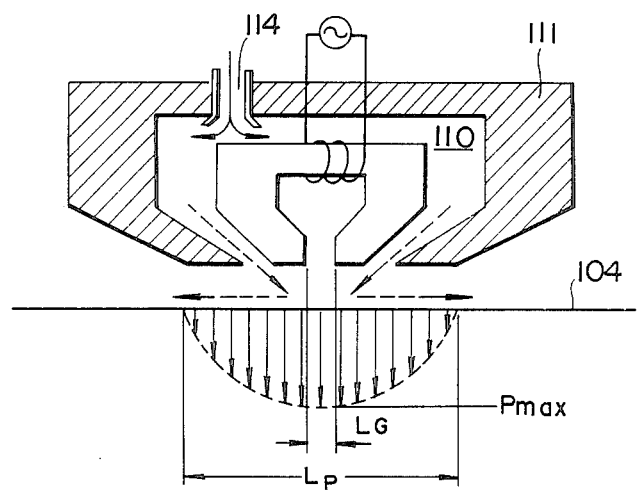
FIG. 5 shows schematically the operation of the transfer head unit.

FIG. 5 also illustrates how the force of pressure contact P is distributed over an area opposite to the front side of air guide member 111. As seen from this figure, the area of pressure contact has a sufficiently extended width $L_P$. Such width $L_P$ can be designed freely by jetting the high pressure air from the four sides of the jet opening of the air guide gap 112, that is, through the rectangular nozzle 113, in such a condition that high pressure air currents from the two long sides intersect each other at approximately the center of the magnetic gap G. In this manner, the relation $LH < < L_P$ which provides for optimum transfer of magnetic recording, wherein LH denotes the width of a magnetic field corresponding to an effective transfer of the magnetic recording, can be satisfied easily so that the resulting copy tape is broadly free from transfer unevenness caused by shortage of pressure contact width.

Figure 6A:
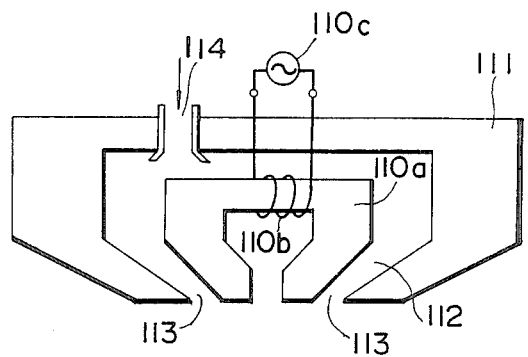
FIG. 6(a), (b) are front and bottom plan views showing the transfer head unit.
Figure 6B:
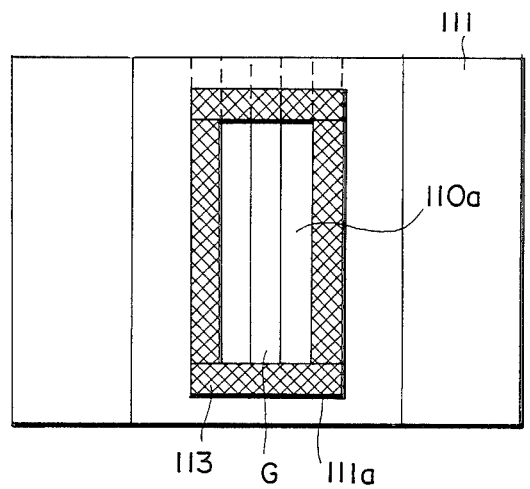

The magnetic transfer head unit 8 is shown in a front view and a bottom plan view in FIGS. 6A and 6B, respectively. In these figures, the approximately rectangular opening 111a provided in the bottom of the air guide member 111 and the gap G of magnetic core 110a of the magnetic transfer head 110 are positioned at the same height above the tapes for defining the abovementioned rectangular nozzle. Although not shown, the magnetic core 110a is securely mounted at a predetermined portion thereof to the inner wall of the air guide member 111 in such a manner that the air guide gap 112 defined by the air guide member 111 and the outer periphery of the core 110a of magnetic transfer head 110 is not stopped up by securing means.

Returning to FIG. 1, a supply reel DS for driving tape 4, a take-up reel DT for driving tape 4, a supply reel MS for master tape 1 and a take-up reel MT for master tape 1 are designed for shorter tape lengths corresponding to the length of the prerecorded program to be duplicated and therefore may be of reduced size and rotational inertia. On the contrary, a supply reel CS and a take-up reel CT for slave tape 2 are designed for longer tape lengths corresponding to the lengths of several consecutive prerecorded programs added together in order to dispense with the manual operation of tape change. Thus, these tape reels are usually of a larger size and an increased rotational inertia. In this case, when the magnetic transfer of a single prerecorded program is completed, the tapes are brought to a stop and the transfer drum 3 is receded in an opposite direction from that shown by arrow mark A for rewinding the driving tape 4 and the master tape 1 to their initial state. Thereafter, the duplicating process is commenced at the terminal position of the preceding recording on the slave tape so that the original recording can be transferred continuously to several copy tapes without the need of carrying out a reel exchange operation for slave tapes.

However, it is difficult in this case to stop the tapes 1, 2, 4 simultaneously because of difference in the rotational inertia among the respective reels DS to CT. Since the relative positions of the tapes 1, 2, 4 referenced to the proceeding direction thereof are fixed on the outer periphery of the rotary drum 3, some tapes may be subjected to unusual tension on account of difference in the stopping time of the reels.

According to the present invention, when it is desired to stop tape travel, the reels CS, CT having larger rotational inertia are braked first and the remaining reels DS, DT, MS and MT are braked in response to changes in tape tension sensed in the vicinity of these reels for preventing occurrence of unusual tension in the tapes.

That is, referring to FIG. 1, a pair of guide rolls 11a, 11b and a pair of guide rolls 12a, 12b are provided in the vicinity of supply reel DS and take-up reel DT for driving tape 4, respectively. Similarly, a pair of guide rolls 13a, 13b and a pair of guide rolls 14a, 14b are provided in the vicinity of supply reel MS and take-up reel MT for master tape 1, respectively. A tension arm 15 and another tension arm 16 are provided as tape tension sensing means between guide rolls 11a and 11b and between guide rolls 12a, 12b, respectively. Similarly, tension arms 17 and 18 are provided between guide rolls 13a and 13b and between guide rolls 14a and 14b, respectively. Furthermore, a tension arm 22 is provided between a pair of guide rolls 21a, 21b in the vicinity of the supply reel CS for copy tape 2, and a tension arm 24 is provided between a pair of guide rolls 23a, 23b in the vicinity of take-up reels CT.

Figure 2:
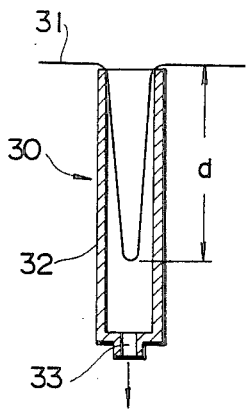
FIG. 2 shows diagrammatically the operating principle of an air column unit as tape tension sensors.

In a modification, a so-called air column device 30 as shown in FIG. 2 may be used as tape tension sensor. The air column device 30 shown in FIG. 2 is formed by a box 32 opened at the top for guiding the tape through the open top into the interior of the box. On the side of the box 32 opposite to said open top is bored a throughhole 33 through which air is discharged for introducing the tape 31 into the interior of the box. Since an amount d of the tape 31 introduced into the box is changed with tape tension for a constant force of air suction, the amount d is the direct measure of the tape tension at the air column device.

Figure 3:
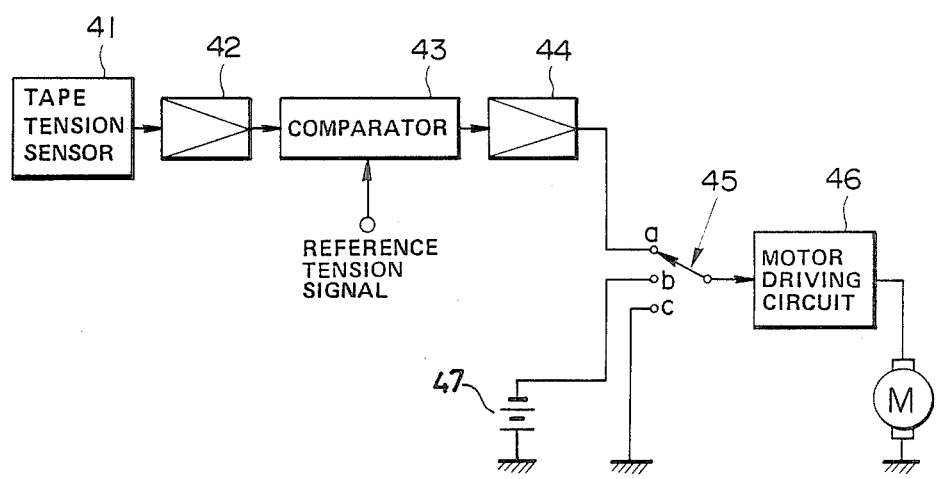
FIG. 3 is a block diagram showing a typical servo circuit for a reel motor.

During tape travel, these tape tension sensors are used for controlling electric motors associated with respective reels for maintaining a constant tape tension in the vicinity of the respective reels. This can be achieved by providing a servo circuit shown by way of example in FIG. 3 for each of driving electric motors M associated with respective reels DS, DT, MS, MT, CS and CT. In the servo circuit, tape tension signals from a tape tension sensor 41 such as tension arm or air column described above are amplified by an amplifier 42 and compared at a comparator 43 with a reference tension signal. The resulting error signal is then amplified by an amplifier 44 if the occasion demands and outputted to a select terminal a of a select switch 45. The output from select switch 45 is fed back through a movable contact of the select switch 45 to a motor driving circuit 46 to motor M for controlling rotational speed and direction of motor M and maintaining a constant tape tension. A second select terminal b of the select switch 45 is connected to an electrical source 47 for impression of a reverse voltage and a third select terminal c is grounded as shown.

It should be noted that, when the rotation of the respective reel motors is controlled as a function of tape tension, control at the supply side reels is opposite in direction to that at the take-up side reels. That is, control at the supply side is such that the rotational speed of the motor is increased with increase in tape tension for increasing the amount of supplied tape and lowering tape tension at the tape supply side. In contrast thereto, at the take-up side, the rotational speed of the motor is lowered or the rotational direction thereof reversed in case of increase in tape tension for decreasing tape tension at the take-up side. Similarly, in case of decrease in the supply side tape tension, the rotational speed of the supply side reel motors is reduced, or the rotational direction thereof reversed. On the contrary, in case of decrease in the take-up side tape tension, the rotational speed of the take-up side reel motors is increased for increasing tape tension at the take-up side.

It is now supposed that a prerecorded program on the master tape 1 has been transferred to the copy tape as described hereinabove and the tapes 1, 2, 4 are to be brought to a stop. In such case, a reverse voltage is impressed from source 47 to at least one of driving reel motors associated with reels CS, CT for copy tapes 2 presenting a larger rotational inertia, in such a manner that said reel motors are driven in an opposite direction to that during magnetic transfer as mentioned hereinabove, as by shifting the movable contact of the select switch 45 from terminal a to terminal b. At this time, the driving system for the reels CS, CT for copy tape 2 is braked first in effect strongly so that the copy tape speed is reduced in opposition to the large inertial force of rotation proper to these reels. Since the copy tape 2, master tape 1 and the driving tape 4 are pressed against the outer periphery of the drum 3 by the pressure rolls 5a, 5b and caused to travel simultaneously in intimate pressure contact with one another, tape tension is decreased at the supply side and increased at the take-up side of the tapes 1, 4 as a function of decrease in the copy tape speed. Therefore, all the motors associated with the reels DS, DT, MS and MT are acted upon by the abovementioned servo circuit so that the rotational speed is lowered or the rotational direction reversed. These tapes 1, 4 can be stopped with a higher response speed because of the lower rotational inertia of the associated reels DS, DT, MS and MT.

From the foregoing it is seen that the arrangement of the present invention provides a tape driving system for a magnetic transfer apparatus according to which, in the case of stopping the respective tapes, a sudden brake is applied, as by impression of a reverse voltage, to at least one of driving electric motors associated with copy tape reels CS, CT presenting a higher rotational inertia for promptly stopping the copy tape 2, and a servo control is performed for reels MS, MT, DS and DT presenting lower rotational inertia for adjusting the tape tension to a constant value. In this manner, the master tape 1 and the driving tape 4 are stopped in synchronism with stop operation of the copy tape 2, so that the tapes 1, 2, 4 can be stopped promptly without causing unusual tape tension. Therefore, the cyclic operation consisting in stopping the tapes upon termination of the magnetic transfer operation, retracting the transfer drum 3, rewinding the master tape 1 and the driving tape 4 to their initial state and again advancing the drum 3 in the direction shown by the arrow mark A in FIG. 1 for again commencing the next magnetic transfer operation, can be performed in a shorter time, with improved efficiency in duplication and reduction in manufacture costs of prerecorded tapes.

What is claimed is:

1. A tape device for a magnetic transfer apparatus comprising a master tape on which originals are prerecorded, a slave tape on which said original signals on said master tape are to be transferred magnetically, a magnetic head adapted for applying a magnetic field to said master tape and said slave tape guided on the periphery of a rotary drum, said master and slave tapes being wound on the periphery of said rotary drum in intimate contact therewith and with each other and driven simultaneously thereon for performing a magnetic transfer of said original signals from said master tape to said slave tape, a supply reel and a take-up reel forming a reel system for said master tape, a supply reel and a take-up reel forming a reel system for said slave tape, tape tension means separately provided in the vicinity of each of said reels, a servo control associated with each of said tape tension means for maintaining a constant tape tension during tape running, a reel motor associated with each of said supply and take-up reels, and brake means for braking at least one of said supply and take-up reels of only whichever of said reel systems has a larger inertia, said tape tension sensing means associated with the reels of the remaining reel system maintaining a constant tension in the associated tapes in the course of simultaneous cessation of travel of the respective tapes.

2. A tape drive device for a magnetic transfer apparatus comprising a master tape on which original signals are prerecorded, a slave tape on which said original signals on said master tape are to be transferred magnetically, a drive tape, a magnetic head adapted for applying a magnetic field to said master tape and said slave tape guided on the periphery of a rotary drum, said master and slave tapes being wound on the periphery of said rotary drum and said drive tape pressing said master and slave tapes against the periphery of said rotary drum so that said master and slave tapes are in intimate contact therewith and with each other and driven simultaneously thereon for performing a magnetic transfer of said original signals from said master tape to said slave tape, a supply reel and take-up reel forming a reel system for said master tape, a supply reel and a take-up reel forming a reel system for said slave tape, tape tension means separately provided in the vicinity of each of said reels, a servo control associated with each of said tape tension means for maintaining a constant tape tension during tape running, a reel motor associated with each of said supply and tape-up reels, and brake means for braking at least one of said supply and take-up reels of only whichever of said reel systems has a larger inertia, said tape tension sensing means associated with the reels of the remaining reel system maintaining a constant tension in the associated tapes in the course of simultaneous cessation of travel of the respective tapes.

* * * * *